US009547227B1

(12) United States Patent
Huang

(10) Patent No.: US 9,547,227 B1
(45) Date of Patent: Jan. 17, 2017

(54) DISPLAY APPARATUS

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 14/958,946

(22) Filed: Dec. 4, 2015

(30) Foreign Application Priority Data

Aug. 7, 2015 (TW) .............................. 104125752 A

(51) Int. Cl.
*G03B 21/62* (2014.01)
*G03B 21/28* (2006.01)
*G09G 3/00* (2006.01)
*G09G 5/14* (2006.01)

(52) U.S. Cl.
CPC .............. *G03B 21/28* (2013.01); *G09G 3/002* (2013.01); *G09G 5/14* (2013.01); *G09G 2300/026* (2013.01)

(58) Field of Classification Search
CPC ......... G03B 21/62; G03B 21/00; G03B 21/16; G03B 21/28; G03B 21/30; G09F 19/18; H04N 5/74
USPC ............................................. 353/119, 74, 94
See application file for complete search history.

(56) References Cited

U.S. PATENT DOCUMENTS

| 6,611,241 B1 | 8/2003 | Firester et al. |
| 7,370,977 B2 | 5/2008 | Lee |
| 2002/0154069 A1* | 10/2002 | Nishio ................... G03B 21/10 345/1.1 |

FOREIGN PATENT DOCUMENTS

| CN | 1383325 A | 12/2002 |
| CN | 100342263 C | 10/2007 |
| CN | 202309944 U | 7/2012 |
| TW | 542495 U | 7/2003 |
| TW | M373496 U | 2/2010 |
| TW | M491842 U | 12/2014 |

* cited by examiner

*Primary Examiner* — Steven H Whitesell Gordon
*Assistant Examiner* — Jerry Brooks
(74) *Attorney, Agent, or Firm* — CKC & Partners Co., Ltd.

(57) ABSTRACT

A display apparatus includes multiple display modules. Each of the display modules includes a display surface, a projecting device, and first, second, and third reflectors. The display surface has long and short edges perpendicular to each other. The projecting device projects a first image having a first optical axis parallel to the short edge. The first reflector reflects the first image to form a first reflected image having a first reflection optical axis perpendicular to the short edge. The second reflector reflects the first reflected image to form a second reflected image having a second reflection optical axis perpendicular to the short edge. The third reflector is parallel to the second reflector and reflects the second reflected image to form a third reflected image having a third reflection optical axis perpendicular to the long and short edges. The third reflected image is projected on the display surface.

10 Claims, 5 Drawing Sheets

DISPLAY APPARATUS

RELATED APPLICATIONS

This application claims priority to Taiwan Application Serial Number 104125752, filed Aug. 7, 2015, which are herein incorporated by reference.

BACKGROUND

Technical Field

The present disclosure relates to a display apparatus, and more particularly, to a video wall.

Description of Related Art

In order to meet the evolving requirements of the screen imaging, technologies of display apparatus continue to progress. In a video wall, a plurality of display modules respectively project images on different parts of the display surface, so as to form a complete image. Because the images on the display surface are formed by projection, the video wall can achieve the large screen display effect at a low cost. In addition, the number of the display modules can be increased according to the actual needs, so the size of the display surface can be increased as requested.

In the constant attempt to improve characteristics of the video wall, there is always a need in the related field to provide a novel video wall.

SUMMARY

This disclosure provides a display apparatus having not only a thin thickness but also a large throw distance. In addition, the display apparatus has a simple internal structure, such that the chance that the internal optical path is obstructed is reduced.

In one aspect of the disclosure, a display apparatus is provided. The display apparatus includes at least one first display module and at least one second display module. The first display module includes a first display surface, a first projecting device, a first reflector, a second reflector, and a third reflector. The first display surface has a first long edge and a first short edge perpendicular to the first long edge. The first projecting device projects a first image having a first optical axis parallel to the first short edge. The first reflector reflects the first image to form a first reflected image having a first reflection optical axis perpendicular to the first short edge. The second reflector reflects the first reflected image to form a second reflected image having a second reflection optical axis perpendicular to the first short edge. The third reflector reflects the second reflected image to form a third reflected image having a third reflection optical axis perpendicular to the first long edge and the first short edge, in which the third reflected image is projected on the first display surface. The second display module includes a second display surface, a second projecting device, a fourth reflector, a fifth reflector, and a sixth reflector. The second display surface has a second long edge and a second short edge perpendicular to the second long edge, in which the first display surface and the second display surface form a display surface of the display apparatus, the second long edge is parallel to the first long edge, and the second short edge is parallel to the first short edge. The second projecting device projects a second image having a second optical axis parallel to the second short edge. The fourth reflector reflects the second image to form a fourth reflected image having a fourth reflection optical axis perpendicular to the second short edge. The fifth reflector reflects the fourth reflected image to form a fifth reflected image having a fifth reflection optical axis perpendicular to the second short edge. The sixth reflector reflects the fifth reflected image to form a sixth reflected image having a sixth reflection optical axis perpendicular to the second long edge and the second short edge, in which the sixth reflected image is projected on the second display surface, and the second reflector, the third reflector, the fifth reflector, and the sixth reflector is parallel to each other.

In one or more embodiments, the third reflector is adjacent to the fifth reflector.

In one or more embodiments, the display apparatus further includes a board having a first surface and a second surface. The third reflector is disposed on the first surface, and the fifth reflector is disposed on the second surface.

In one or more embodiments, the display apparatus further includes a board having a first surface. The third reflector and the sixth reflector are both disposed on the first surface.

In one or more embodiments, the first projecting device and the second projecting device respectively upwardly project the first image and the second image.

In one or more embodiments, an angle between the first optical axis and the first reflection optical axis is about 90°, and an angle between the second optical axis and the fourth reflection optical axis is about 90°.

In one or more embodiments, the first reflection optical axis is perpendicular to the first long edge, and the fourth reflection optical axis is perpendicular to the second long edge.

In one or more embodiments, an angle between the first reflection optical axis and the second reflection optical axis is about 74°, and an angle between the fourth reflection optical axis and the fifth reflection optical axis is about 74°.

In one or more embodiments, an angle between the second reflection optical axis and the third reflection optical axis is about 74°, and an angle between the fifth reflection optical axis and the sixth reflection optical axis is about 74°.

In one or more embodiments, a plurality of the first display modules and a plurality of the second display modules are disposed in an array, and the first display surfaces and the second surfaces form the display surface of the display apparatus.

By the specially designed optical path of the display apparatus, the display apparatus has not only a thin thickness but also a large throw distance. In addition, by making the third reflector parallel to the fifth reflector, the third reflector and the fifth reflector can be disposed on the same fixing mechanism (i.e., the board); alternatively, by making the third reflector parallel to the sixth reflector, the third reflector and the sixth reflector can be disposed on the same fixing mechanism (i.e., the board). Therefore, the number of the fixing mechanisms of the optical components can be significantly reduced, such that the internal structure of the display apparatus can be simplified and thus the chance that the internal optical path of the display apparatus 100 may become obstructed is reduced.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
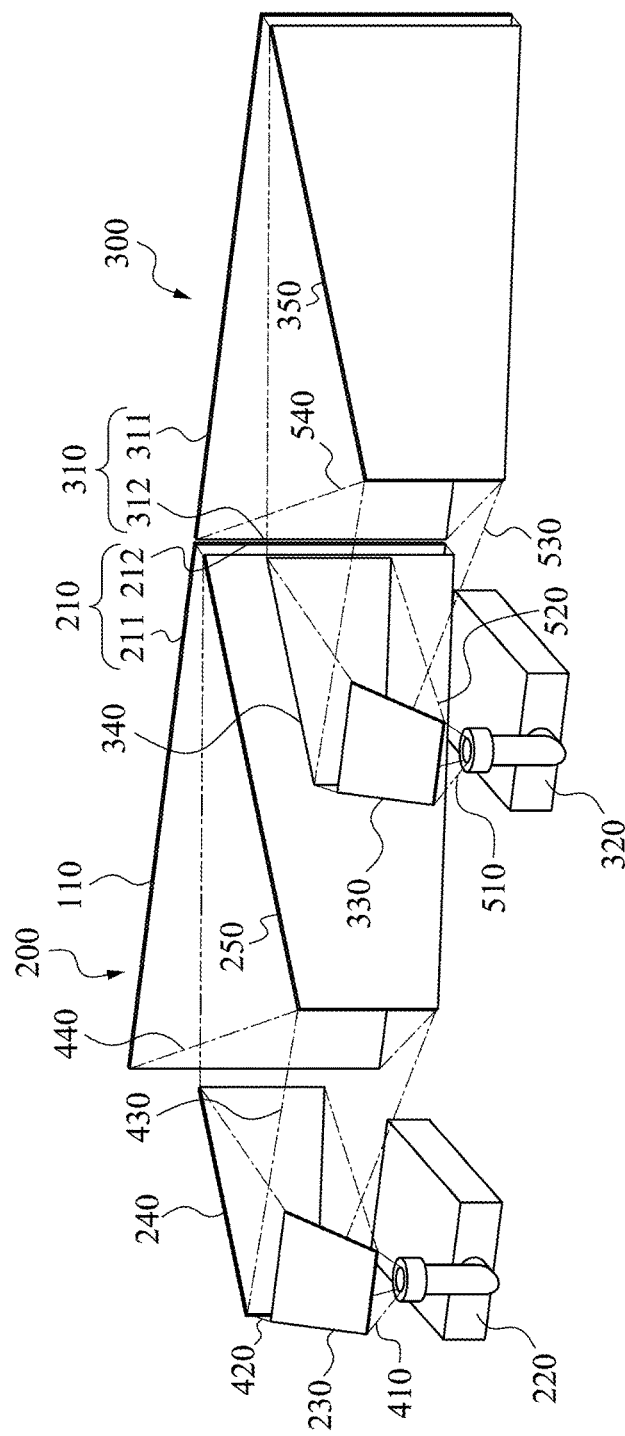
FIG. 1 is a schematic perspective view of a display apparatus according to one embodiment of this invention.

FIG. 1 is a schematic perspective view of a display apparatus 100 according to one embodiment of this invention. A display apparatus 100 is provided. Specifically, the display apparatus 100 is a video wall. More specifically, in the display apparatus 100, a plurality of the display modules respectively project images on different parts of a display surface 110 of the display device 100, so as to form a complete image. In the embodiment, the display apparatus 100 includes a first display module 200 and a second display module 300.

Figure 2:
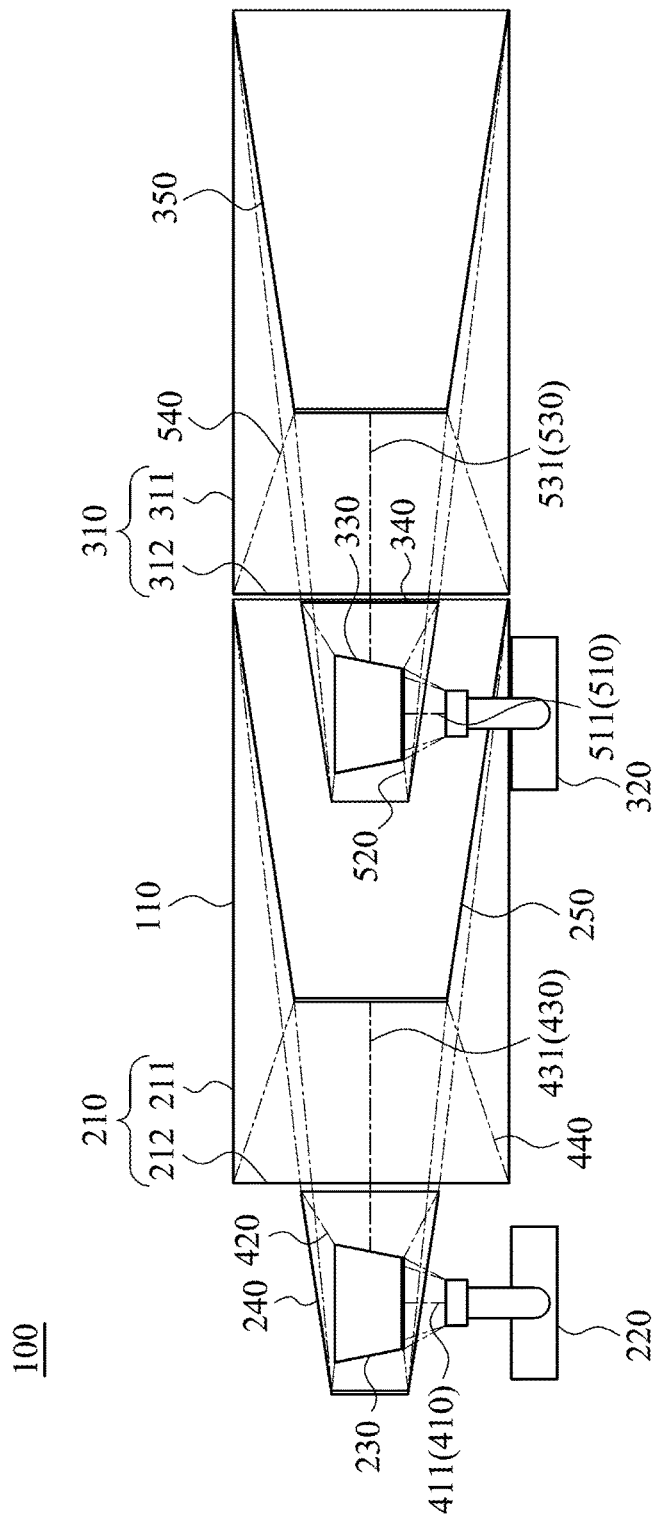
FIG. 2 is a schematic rear view of the display apparatus according to one embodiment of this invention.
Figure 3:
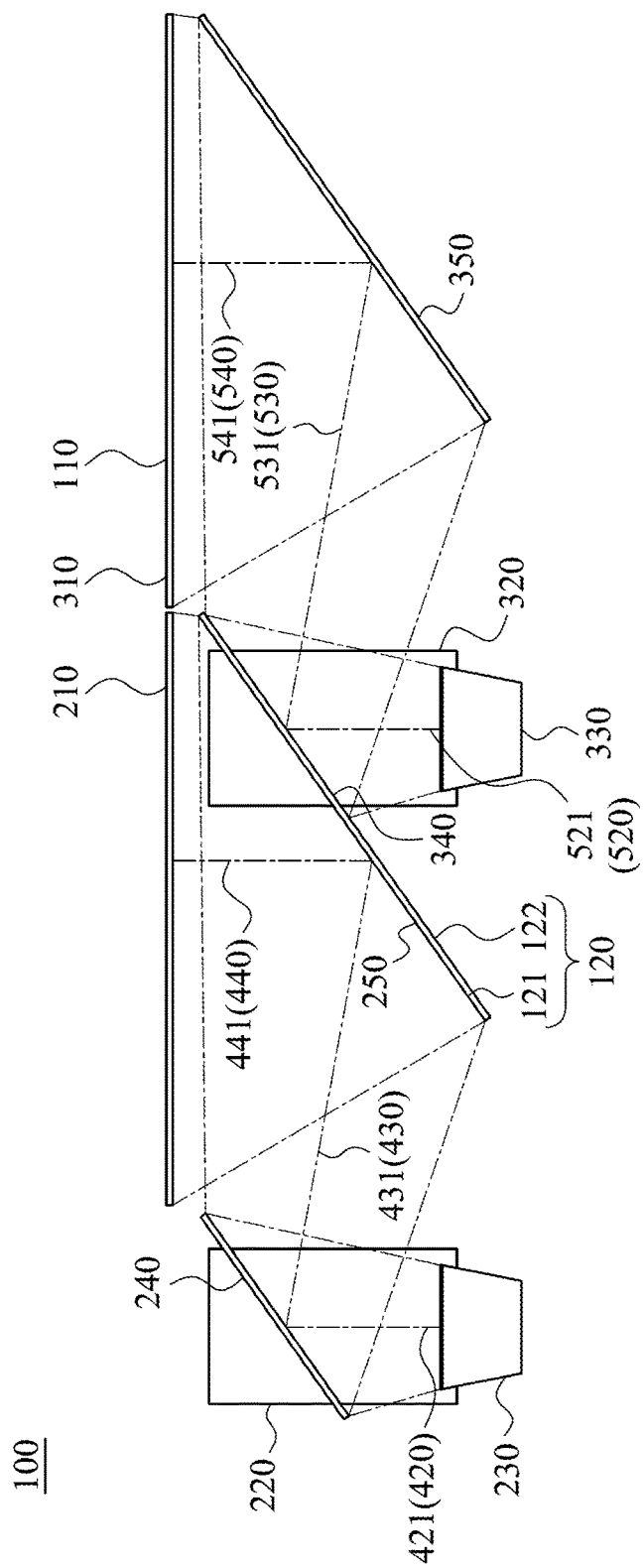
FIG. 3 is a schematic top view of the display apparatus according to one embodiment of this invention.

FIG. 2 is a schematic rear view of the display apparatus 100 according to one embodiment of this invention. FIG. 3 is a schematic top view of the display apparatus 100 according to one embodiment of this invention. As shown in FIG. 1 to FIG. 3, the first display module 200 includes a first display surface 210, a first projecting device 220, a first reflector 230, a second reflector 240, and a third reflector 250. The first display surface 210 has a first long edge 211 and a first short edge 212 perpendicular to the first long edge 211. The first projecting device 220 projects a first image 410 having a first optical axis 411 (see FIG. 2) parallel to the first short edge 212. The first reflector 230 reflects the first image 410 to form a first reflected image 420 having a first reflection optical axis 421 perpendicular to the first short edge 212. The second reflector 240 reflects the first reflected image 420 to form a second reflected image 430 having a second reflection optical axis 431 (see FIG. 2 and FIG. 3) perpendicular to the first short edge 212. The third reflector 250 reflects the second reflected image 430 to form a third reflected image 440 having a third reflection optical axis 441 perpendicular to the first long edge 211 and the first short edge 212, in which the third reflected image 440 is projected on the first display surface 210.

The second display module 300 includes a second display surface 310, a second projecting device 320, a fourth reflector 330, a fifth reflector 340, and a sixth reflector 350. The second display surface 310 has a second long edge 311 and a second short edge 312 perpendicular to the second long edge 311, in which the first display surface 210 and the second display surface 310 form a display surface 110 of the display apparatus 100, the second long edge 311 is parallel to the first long edge 211, and the second short edge 312 is parallel to the first short edge 212. The second projecting device 320 projects a second image 510 having a second optical axis 511 (see FIG. 2) parallel to the second short edge 312. The fourth reflector 330 reflects the second image 510 to form a fourth reflected image 520 having a fourth reflection optical axis 521 (see FIG. 3) perpendicular to the second short edge 312. The fifth reflector 340 reflects the fourth reflected image 520 to form a fifth reflected image 530 having a fifth reflection optical axis 531 (see FIG. 2 and FIG. 3) perpendicular to the second short edge 312. The sixth reflector 350 reflects the fifth reflected image 530 to form a sixth reflected image 540 having a sixth reflection optical axis 541 (see FIG. 3) perpendicular to the second long edge 311 and the second short edge 312, in which the sixth reflected image 540 is projected on the second display surface 310, and the second reflector 240, the third reflector 250, the fifth reflector 340, and the sixth reflector 350 is parallel to each other.

In a conventional video wall, different display modules respectively project images on different parts of a display surface, and the images are expanding when the images proceed. Therefore, the proceed directions of the light beams projected on the adjacent edge parts of the different parts of the display surface are different, and thus the user may find that the magnitude of the light beams projected on the adjacent edge parts of the different parts of the display surface are different, such that the display surface can not show their integrity.

In order to solve the aforementioned problem, the throw distances of the first display module 200 and the second display module 300 are increased, such that the third reflected image 440 and the sixth reflected image 540 are respectively projected on the first display surface 210 and the second display surface 310 in a manner similar to parallel beams. Therefore, the proceed directions of the light beams projected on the adjacent edge parts of the different parts of the first display surface 210 and the second display surface 310 are approximately the same, and thus the user find that the magnitude of the light beams projected on the adjacent edge parts of the different parts of the display surface 110 are approximately the same, such that the display surface 110 shows their integrity.

Due to the miniaturization trend, if the thickness of the display apparatus 100 (the length perpendicular to the display surface 110) is smaller, the display apparatus 100 may become more popular in the market. However, if the thickness of the display apparatus 100 is smaller, it is more difficult to increase the throw distances of the first display module 200 and the second display module 300, such that the aforementioned problem occurs. By the aforementioned specially designed optical path of the display apparatus 100, the throw distance of the first display module 200 may be about 1.7 times the first short edge 212, the thickness of the first display module 200 may be about two-thirds of the first short edge 212, the throw distance of the second display module 300 may be about 1.7 times the second short edge 312, and the thickness of the second display module 300 may be about two-thirds of the second short edge 312. Therefore, the display apparatus 100 has not only a thin thickness but also a large throw distance.

As shown in FIG. 1, in the aforementioned optical path, there is an adequate spacing between each optical component (for example, the first display surface 210, the first projecting device 220, and the first reflector 230), so there is enough space between each optical component to dispose mechanisms supporting and fixing each optical component, such that the optical path of each image (for example, the first image 410 and the first reflected image 420) is not obstructed.

Specifically, as shown in FIG. 3, the display apparatus 100 further includes a board 120 having a first surface 121 and a second surface 122. The third reflector 250 is disposed on the first surface 121, and the fifth reflector 340 is disposed on the second surface 122. Therefore, the third reflector 250 is adjacent to the fifth reflector 340.

More specifically, in this embodiment, the third reflector 250 and the fifth reflector 340 are formed by respectively plating silver or aluminum on the first surface 121 and the second surface 122 of the board 120. Embodiments of this disclosure are not limited thereto. In other embodiments, the third reflector 250 and the fifth reflector 340 may be independently formed first and then respectively disposed on the first surface 121 and the second surface 122 of the board 120.

Embodiments of this disclosure are not limited thereto. People having ordinary skill in the art can make proper modifications to the board 120, the third reflector 250, and the fifth reflector 340 depending on the actual application.

Since the third reflector 250 is parallel to the fifth reflector 340, the third reflector 250 and the fifth reflector 340 can be disposed on the same fixing mechanism (i.e., the board 120). Therefore, the number of the fixing mechanisms of the optical components can be significantly reduced, such that the internal structure of the display apparatus 100 can be simplified and thus the chance that the internal optical path of the display apparatus 100 may be obstructed is reduced.

Specifically, the length of the first long edge 211 is the same as that of the second long edge 311, and the length of the first short edge 212 is the same as that of the second short edge 312. Embodiments of this disclosure are not limited thereto. In other embodiments, the length of the first long edge 211 may be different from that of the second long edge 311, and the length of the first short edge 212 is different from that of the second short edge 312.

Specifically, the first projecting device 220 and the second projecting device 320 may respectively upwardly project the first image 410 and the second image 510. Therefore, the first projecting device 220 and the second projecting device 320 can be disposed at lower positions of the first display module 200 and the second display module 300, so as to enhance the stability of the first display module 200 and the second display module 300.

Specifically, an angle between the first optical axis 411 and the first reflection optical axis 421 is about 90°, and an angle between the second optical axis 511 and the fourth reflection optical axis 521 is about 90°. Embodiments of this disclosure are not limited thereto. People having ordinary skill in the art can make proper modifications to the first optical axis 411, the second optical axis 511, the first reflection optical axis 421, and the fourth reflection optical axis 521 depending on the actual application.

Specifically, the first reflection optical axis 421 is perpendicular to the first long edge 211, and the fourth reflection optical axis 521 is perpendicular to the second long edge 311. Embodiments of this disclosure are not limited thereto. People having ordinary skill in the art can make proper modifications to the first long edge 211, the second long edge 311, the first reflection optical axis 421, and the fourth reflection optical axis 521 depending on the actual application.

Specifically, an angle between the first reflection optical axis 421 and the second reflection optical axis 431 is about 74°, and an angle between the fourth reflection optical axis 521 and the fifth reflection optical axis 531 is about 74°. An angle between the second reflection optical axis 431 and the third reflection optical axis 441 is about 74°, and an angle between the fifth reflection optical axis 531 and the sixth reflection optical axis 541 is about 74°. Embodiments of this disclosure are not limited thereto. People having ordinary skill in the art can make proper modifications to the first reflection optical axis 421, the second reflection optical axis 431, the third reflection optical axis 441, the fourth reflection optical axis 521, the fifth reflection optical axis 531, and the sixth reflection optical axis 541 depending on the actual application.

Figure 4:
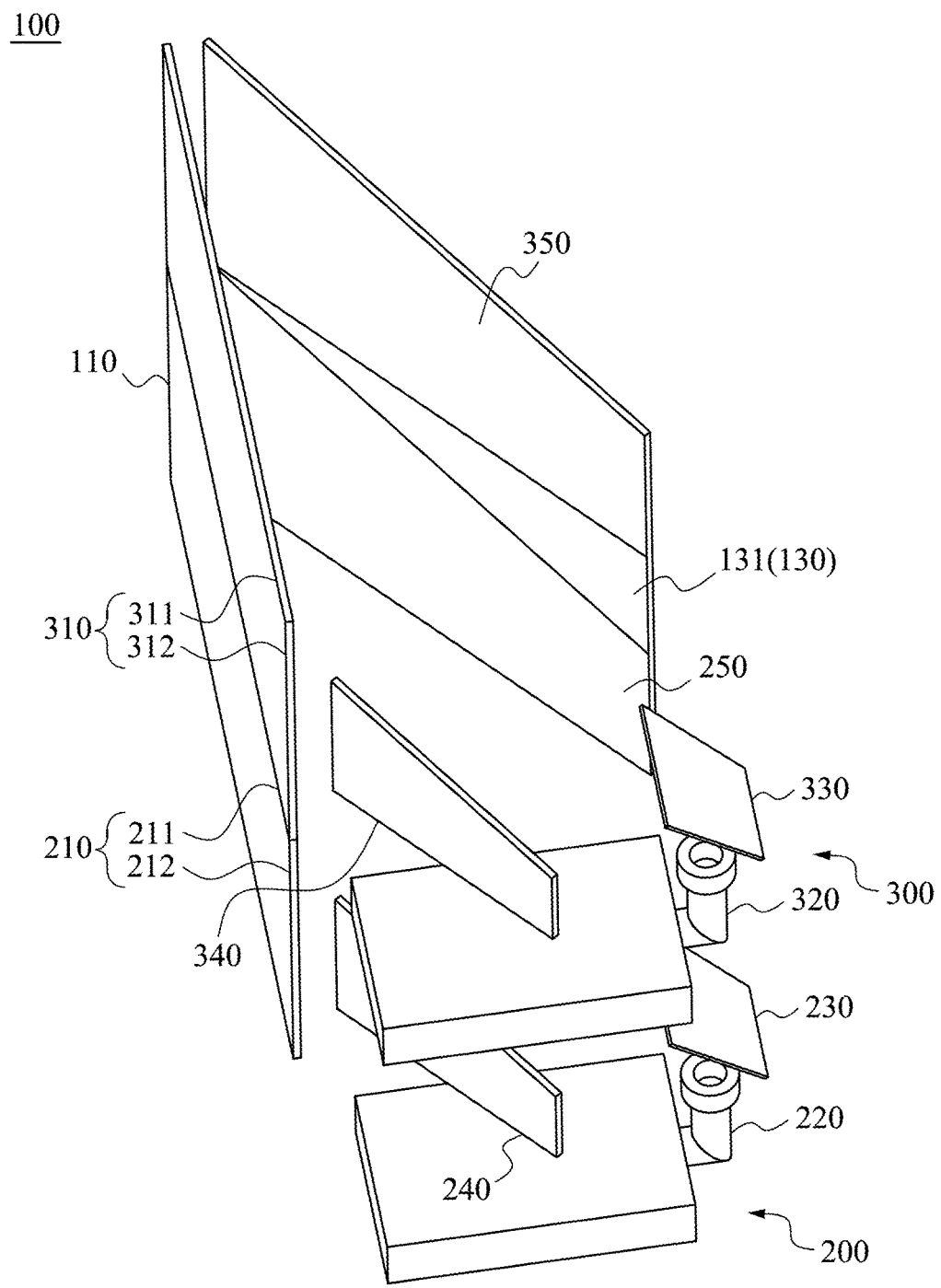
FIG. 4 is a schematic perspective view of the display apparatus according to another embodiment of this invention.

FIG. 4 is a schematic perspective view of the display apparatus 100 according to another embodiment of this invention. As shown in FIG. 4, the display apparatus 100 of this embodiment is similar to the display apparatus 100 of the aforementioned embodiment, and the main difference is that in the aforementioned embodiment, the second display module 300 is disposed on the left side of the first display module 200, but in this embodiment, the second display module 300 is disposed above the first display module 200.

Specifically, the display apparatus 100 further includes a board 130 having a first surface 131. The third reflector 250 and the sixth reflector 350 are both disposed on the first surface 131. More specifically, the third reflector 250 and the sixth reflector 350 are formed by respectively plating silver or aluminum on the first surface 131.

Since the third reflector 250 is parallel to the sixth reflector 340, the third reflector 250 and the sixth reflector 350 can be disposed on the same fixing mechanism (i.e., the board 130). Therefore, the number of the fixing mechanisms of the optical components can be significantly reduced, such that the internal structure of the display apparatus 100 can be simplified and thus the chance that the internal optical path of the display apparatus 100 is obstructed is reduced.

Figure 5:
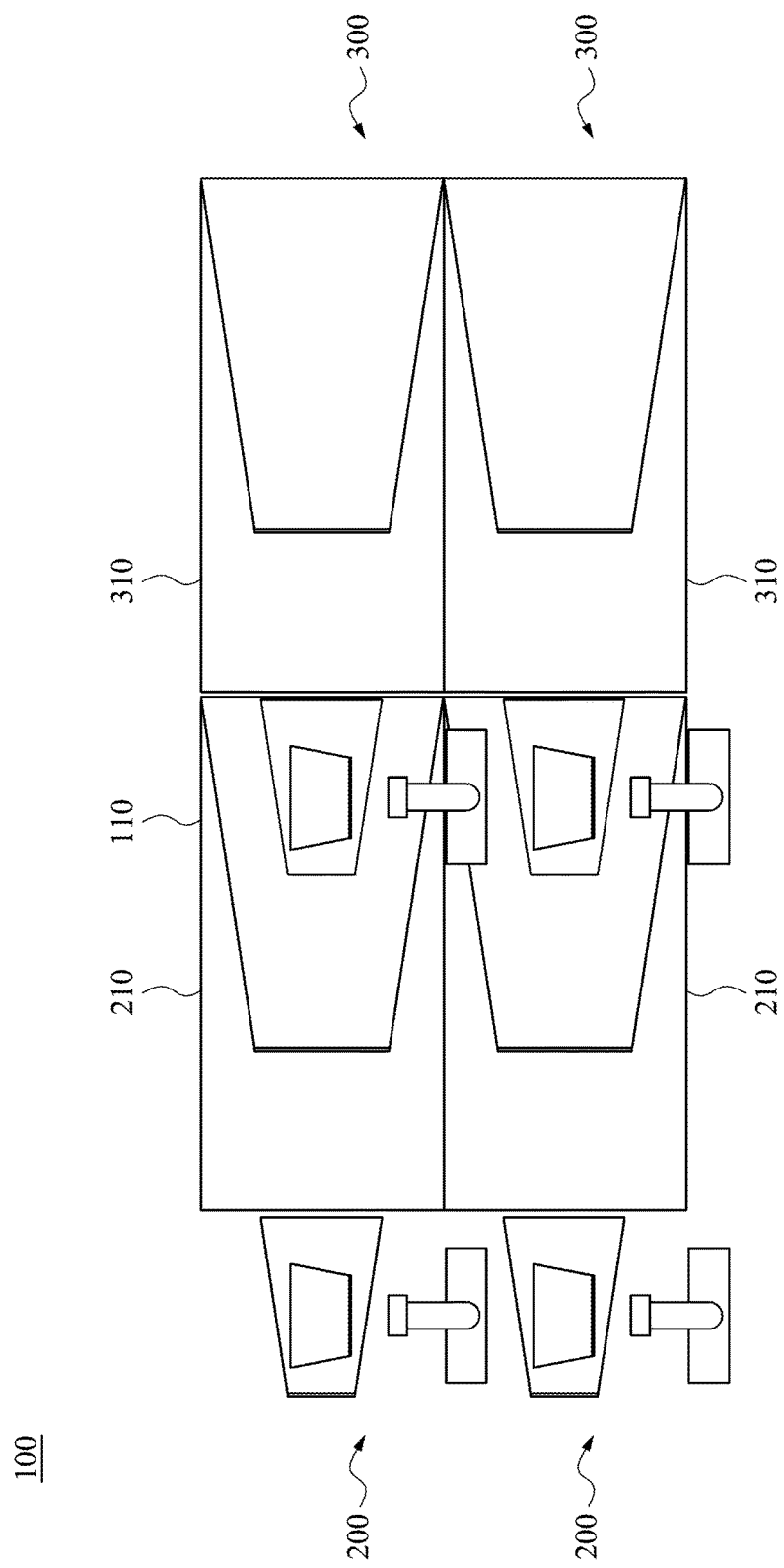
FIG. 5 is a schematic rear view of the display apparatus according to another embodiment of this invention.

FIG. 5 is a schematic rear view of the display apparatus 100 according to another embodiment of this invention. As shown in FIG. 5, the display apparatus 100 of this embodiment is similar to the display apparatus 100 of the aforementioned embodiments, and the main difference is described below.

A plurality of the first display modules 200 and a plurality of the second display modules 300 are disposed in an array, and the first display surfaces 210 and the second surfaces 310 form the display surface 110 of the display apparatus 100.

By making the third reflector 250 parallel to the fifth reflector 340, the third reflector 250 and the fifth reflector 340 can be disposed on the same fixing mechanism (i.e., the board 120); alternatively, by making the third reflector 250 parallel to the sixth reflector 350, the third reflector 250 and the sixth reflector 350 can be disposed on the same fixing mechanism (i.e., the board 130). Therefore, the number of the fixing mechanisms of the optical components can be significantly reduced, such that the internal structure of the display apparatus 100 can be simplified and thus the chance that the internal optical path of the display apparatus 100 is obstructed is reduced.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. A display apparatus, comprising:
at least one first display module, comprising:
a first display surface having a first long edge and a first short edge perpendicular to the first long edge;
a first projecting device configured to project a first image having a first optical axis parallel to the first short edge;
a first reflector configured to reflect the first image to form a first reflected image having a first reflection optical axis perpendicular to the first short edge;
a second reflector configured to reflect the first reflected image to form a second reflected image having a second reflection optical axis perpendicular to the first short edge; and
a third reflector configured to reflect the second reflected image to form a third reflected image having a third reflection optical axis perpendicular to the first long edge and the first short edge, wherein the third reflected image is projected on the first display surface; and
at least one second display module, comprising:
a second display surface having a second long edge and a second short edge perpendicular to the second long edge, wherein the first display surface and the second display surface form a display surface of the display apparatus, the second long edge is parallel to the first long edge, and the second short edge is parallel to the first short edge;
a second projecting device configured to project a second image having a second optical axis parallel to the second short edge;
a fourth reflector configured to reflect the second image to form a fourth reflected image having a fourth reflection optical axis perpendicular to the second short edge;
a fifth reflector configured to reflect the fourth reflected image to form a fifth reflected image having a fifth reflection optical axis perpendicular to the second short edge; and
a sixth reflector configured to reflect the fifth reflected image to form a sixth reflected image having a sixth reflection optical axis perpendicular to the second long edge and the second short edge, wherein the sixth reflected image is projected on the second display surface, and the second reflector, the third reflector, the fifth reflector, and the sixth reflector is parallel to each other.

2. The display apparatus of claim 1, wherein the third reflector is adjacent to the fifth reflector.

3. The display apparatus of claim 1, further comprising a board having a first surface and a second surface, wherein the third reflector is disposed on the first surface, and the fifth reflector is disposed on the second surface.

4. The display apparatus of claim 1, further comprising a board having a first surface, wherein the third reflector and the sixth reflector are both disposed on the first surface.

5. The display apparatus of claim 1, wherein the first projecting device and the second projecting device respectively upwardly project the first image and the second image.

6. The display apparatus of claim 1, wherein an angle between the first optical axis and the first reflection optical axis is about 90°, and an angle between the second optical axis and the fourth reflection optical axis is about 90°.

7. The display apparatus of claim 1, wherein the first reflection optical axis is perpendicular to the first long edge, and the fourth reflection optical axis is perpendicular to the second long edge.

8. The display apparatus of claim 1, wherein an angle between the first reflection optical axis and the second reflection optical axis is about 74°, and an angle between the fourth reflection optical axis and the fifth reflection optical axis is about 74°.

9. The display apparatus of claim 1, wherein an angle between the second reflection optical axis and the third reflection optical axis is about 74°, and an angle between the fifth reflection optical axis and the sixth reflection optical axis is about 74°.

10. The display apparatus of claim 1, wherein a plurality of the first display modules and a plurality of the second display modules are disposed in an array, and the first display surfaces and the second surfaces form the display surface of the display apparatus.

* * * * *